(12) United States Patent
Xu et al.

(10) Patent No.: US 8,059,207 B2
(45) Date of Patent: Nov. 15, 2011

(54) SYSTEM AND METHOD FOR VIDEO NOISE REDUCTION USING AN ADAPTIVE TEMPORAL METHOD WITH MOTION DETECTION AND MOTION COMPENSATION

(75) Inventors: Ning Xu, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1251 days.

(21) Appl. No.: 11/710,594

(22) Filed: Feb. 23, 2007

(65) Prior Publication Data

US 2008/0204600 A1    Aug. 28, 2008

(51) Int. Cl.
*H04N 7/18*    (2006.01)
*H04N 5/00*    (2006.01)

(52) U.S. Cl. ........ 348/701; 348/607; 348/699; 348/700; 382/275; 382/261; 375/240.29

(58) Field of Classification Search .................. 348/607, 348/620, 699, 700, 701; 375/240.16, 240.29; 382/236, 261, 275
See application file for complete search history.

(56) References Cited

U.S. PATENT DOCUMENTS

| | | | | |
|---|---|---|---|---|
| 6,037,986 A | * | 3/2000 | Zhang et al. | 375/240.12 |
| 7,792,381 B2 | * | 9/2010 | Rhee | 382/260 |

* cited by examiner

*Primary Examiner* — Michael Lee
*Assistant Examiner* — Jean W Desir

(57) ABSTRACT

An adaptive temporal noise reduction method that adaptively combines motion adaptive filtering results and motion compensated results to reduce Gaussian additive noise in video sequences is described herein. The system determines the motion detection and motion compensation results from the current frame and the filtered previous frame. Measurements on the video are used to determine a probabilistic measure of noise that is employed to adaptively combine the motion detection and motion compensation results.

20 Claims, 9 Drawing Sheets

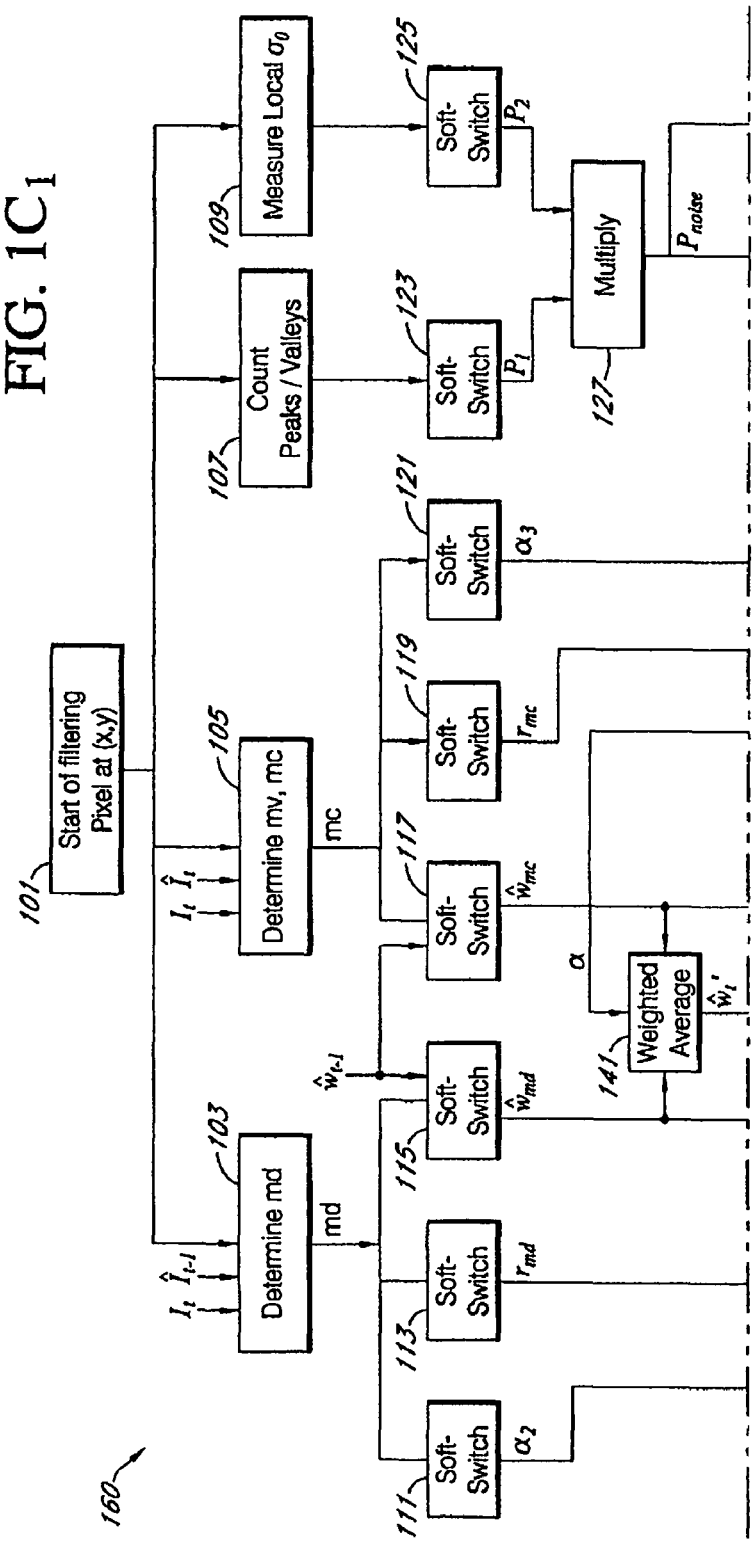

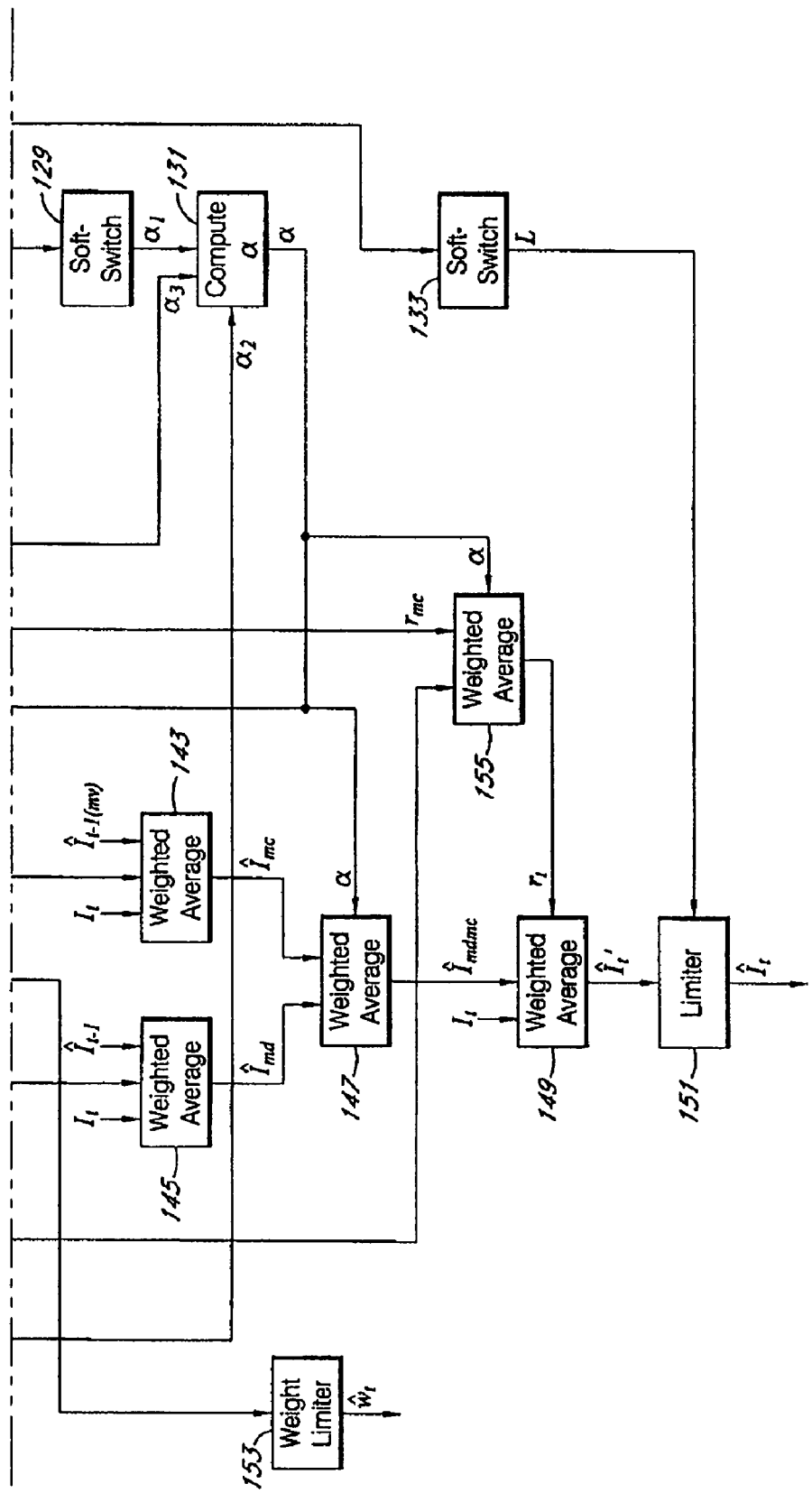
FIG. 1C₂

Soft Switching

Motion adaptive filtering

SYSTEM AND METHOD FOR VIDEO NOISE REDUCTION USING AN ADAPTIVE TEMPORAL METHOD WITH MOTION DETECTION AND MOTION COMPENSATION

BACKGROUND OF THE INVENTION

1. Field of the Invention

The present invention relates generally to video and image processing. In particular, the present invention relates to the reduction of Gaussian additive noise in video sequences by adaptively weight averaging pixels in time using motion detection, motion compensation, and estimation of local noise characteristics to determine the weights.

2. Description of the Related Technology

In the past decade applications of digital video have increased dramatically. These applications range from the use of digital video for cinemagraphic archiving, medical imaging, video storage and playback on DVDs. In addition, digital video also forms the basis for more efficiently transmitting television, via cable, over the air, and over the Internet.

The last application is especially important. Compression algorithms based on digital video are able to achieve higher compression ratios than what is capable through analog techniques, thereby reducing the bandwidth required for transmission of video. Where formerly a cable channel's bandwidth would support the transmission of a single analog video channel, with digital compression cable operators could operate at various points on the resolution/bandwidth trade off curve, allowing 12 video channels of average quality or 7-8 channels of superior quality to be transmitted in a bandwidth that formerly carried one analog channel of video. Video compression has also made HDTV possible: without it the bandwidth required for transmission could not be supported within the present allocations for bandwidth. Digital video is fundamental to the transmission of video using the Internet's packetized techniques. It allows the use of buffers to eliminate variations in a packet's time of arrival, and the application of even more powerful compression algorithms that further reduce the usage by the video signal of the channel's capacity (which in the Internet is shared by other users).

The pervasive use of digital video has spawned increased interest and demand for noise filtering algorithms. Noise reduction can be critical to overall system operation, since the presence of noise in video not only degrades its visual quality but affects subsequent signal processing tasks as well. Noise is especially deleterious to digital video that will be compressed and decompressed. The effect is inherent in compression algorithms. These algorithms are designed to recreate a sequence of images that will be perceived by the eye as being virtually identical to the images created from the uncompressed data. Since they do not reject noise, the algorithms treat it as signal, and attempt to create data that represents components of noise that will be most visible to the eye. Worse yet, in most instances the output of the video compression unit is limited in data rate to match it to the rated capacity of the channel through which the data is transmitted. When noise captures some of bits that are outputted by the video compressor, fewer bits are left to represent the real signal. Therefore noise reduction—the elimination, as far as possible, of noise contaminating the video—is a desirable adjunct to video compression.

Noise is a catch-all term for an unwanted signal that is interfering with the signal that is desired. It is noticeably present in television receivers situated in areas with having marginal signal conditions for receiving a conventional amplitude modulated vestigial sideband television signal. This noise is commonly modelled as being additive, white and Gaussian. In the case of analog video delivered by satellite, the video signal is frequency modulated onto a carrier. The signal out of the ground receiver is accompanied by noise that is additive and Gaussian when the receiver is operating above threshold (i.e., the vector representing the noise in signal space is usually much smaller than the vector representing the modulated signal). When the system is close to threshold, the character of the noise becomes impulsive, leading, for example, to the clicks that are heard on an automobile radio as the FM station being received goes out of range. For video transmitted by satellite, the impulses appear in the picture as short white or dark streaks. A satellite or terrestrial television receiver may also be affected by man-made noise such as impulsive noise originating from motor vehicles.

Applying noise reduction to video is the process of identifying the desired video signal and using that information to discriminate against the noise. Best performance is achieved by utilizing one of a broad range of processing options that is available only through the use of digital techniques. The input video would be sampled into numerical pixel values indexed by horizontal and vertical spatial coordinates and a time coordinate that is an indicator of frame number. A filtering operation is modelled as a sequence of arithmetic operations performed on the input samples to form an output pixel.

The present approaches to noise reduction filtering can be categorized into three types: a spatial noise reduction filter, a temporal noise reduction filter and 3D noise reduction filter. The spatial noise reduction filter filters the input image in the spatial domain only, ignoring information in the temporal direction. Temporal noise reduction filtering operates only on pixels in the temporal direction, i.e., having different positions on the time axis, and can further be divided into motion adaptive methods and motion compensated methods. The motion adaptive methods process the pixels at the same location in width and height from frame to frame, basing the filter parameters on the degree to which relative motion between the frames at the pixel location is detected. The motion compensated methods filter pixels along a motion trajectory that is based on evidence taken from motion estimation results. Existing three dimensional noise reduction filters combine temporal filters with spatial filters to get the benefits of each.

Noise reduction inherently implies averaging together elements of the signal that are almost identical. Suppose a given pixel has a noise-free value of 0.5, meaning its brightness is half-way between peak white and black. The pixel is contaminated by noise $n_1$, so the pixel value that is actually available is $P_1=0.5+n_1$. With additional knowledge, a second pixel may be found in another position with value $P_2=0.5+n_2$, where $n_1$ and $n_2$ are both noise values and are uncorrelated. The weighted average of 0.5 $P_1$+0.5 $P_2$ is found to be equal to $0.5+\frac{1}{2}(n_1+n_2)$. The power in $\frac{1}{2}(n_1+n_2)$ is one-half the power in $n_1$ or $n_2$. Thus, averaging together the values of the two pixels improves the signal/noise ratio of the estimated pixel value by a factor of 2. However, if $P_2=0.3+n_2$, meaning that the brightness of the second pixel was closer to black, then 0.5 $P_1$+0.5 $P_2=0.4+\frac{1}{2}(n_1+n_2)$. The net effect of weighting $P_1$ and $P_2$ equally before averaging in the second case is to introduce an error into the estimate for the brightness of the pixel the weighted average is supposed to represent. This example illustrates the basic principle of this invention: to reduce the noise level associated with a particular pixel, weight average its value with a second pixel value whose noise free brightness is close to the one in question. When the confidence level in the equality of the noise free brightness levels is high, the weights assigned to the 2 pixel values should be approximately equal; if the confidence level is low, the second pixel level is effectively disregarded by making its weight close to zero, with the first pixel value weighted by (1−weight used for 2nd pixel).

One advantage of temporal noise reduction filtering is that it is more probable that a second pixel can be found in the previous frame that has a similar noise-free brightness level to a given pixel in the current frame, because often only small changes occur in video from frame to frame. Another advantage is that the pixel trajectories along which processing takes place are one-dimensional, extending from a pixel in one frame to another pixel to the next. (The trajectories become discontinuous when there is a scene change.) Thus the processing for temporal noise reduction only looks backwards in time for pixel values to use for weight averaging with the pixel in the current frame. To utilize the simple structure of temporal filtering, a method is needed that uses measurements taken from the input data itself, either unprocessed or filtered, to adaptively sense which pixels should be averaged together and what weights should be placed on each in averaging.

SUMMARY OF CERTAIN INVENTIVE ASPECTS

Embodiments of the invention provide a method and system for reducing the effect of additive Gaussian noise in video sequences using temporal filtering; by adaptively weight averaging pixels in time using motion detection, motion compensation, and estimation of local noise characteristics to determine the weights.

An inventive aspect of the system presented here is a method of reducing the effect of additive Gaussian noise affecting a plurality of sequential video frames through the use of temporal filtering. The method forms a measure of the difference between a neighborhood of a pixel in the current frame and the neighborhood of a pixel in a filtered frame that precedes it in time. It also finds a motion vector that is indicative of motion between a neighborhood of the pixel in the current frame and a similar neighborhood of a motion compensated pixel in a filtered frame and expresses the similarity of the two neighborhoods in a second measure. The method then estimates the noise affecting the pixel in the current frame. The filter's output is computed by weight averaging the pixel in the current frame with a succession of second pixels formed from the results of motion detection, motion estimation, motion compensation and noise estimation.

In another inventive aspect, the system performs the operations needed to reduce additive Gaussian noise by temporal filtering. It consists of two frame buffers used to hold the results of filter action, an input buffer that holds the pixel intensities of the current frame, and an adaptive temporal noise reduction block that utilizes motion detection and motion compensation metrics based on the current frame and the filtered frame that precedes it, and inputs from the three buffers to form filtered pixels that comprise the current filtered frame.

BRIEF DESCRIPTION OF THE DRAWINGS

FIG. 1C provides a detailed block diagram of the computational structure of the adaptive temporal noise reduction filter whereby data is read from and written to the frame buffers in FIG. 1B.

DETAILED DESCRIPTION OF CERTAIN INVENTIVE EMBODIMENTS

Figure 1A:
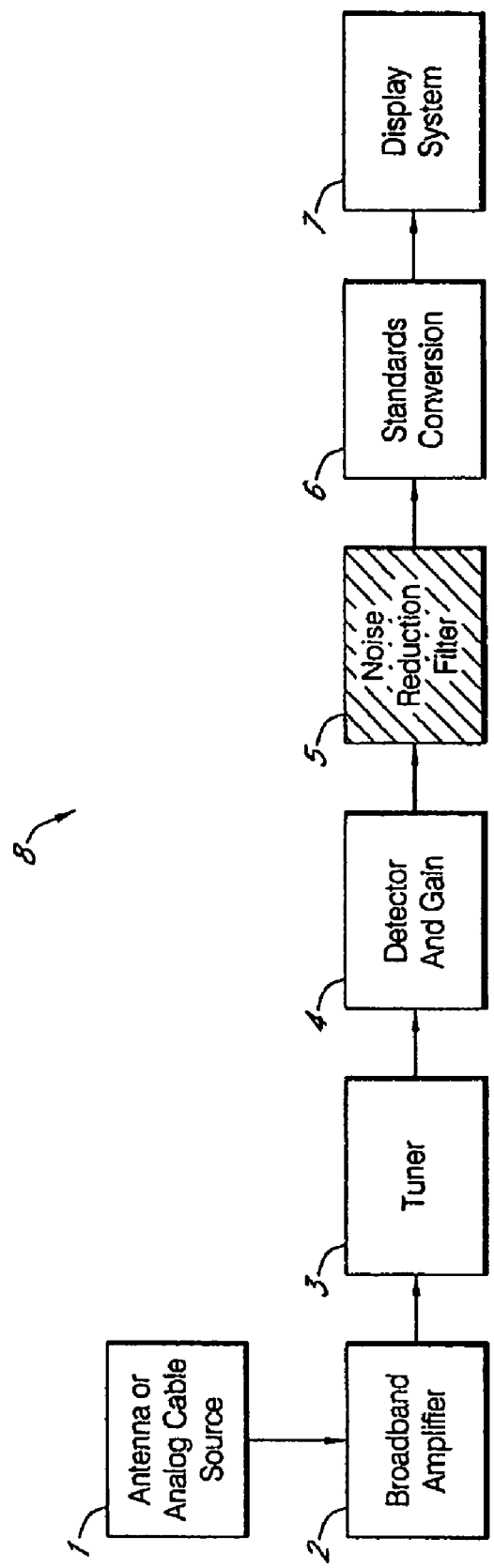
FIG. 1A is a block diagram of a television receiver showing where the noise reduction filter would be applied.

The following detailed description is directed to certain specific aspects of the temporal noise reduction filter. However, the system can be embodied in a multitude of different ways as defined and covered by the claims. In this description, reference is made to the drawings wherein like parts are designated with like numerals throughout. Each drawing is given a range of numbers to assign to parts used for the first time in the drawing.

Today's television receivers operate at a number of accepted standards ranging, for example, from NTSC transmitting 525 lines of video at 30 frames/sec. to HDTV based on 1080 lines, and, if progressively scanned, transmitting 60 frames/sec. The receiver display, however, does not operate at a multiplicity of standards; rather, it may be designed to operate at the standard having the greatest number of lines and highest frame rate. When video conforming to a lesser standard, with fewer frames and lines, is received, the receiver responds by interpolating between the received frames and lines to create the video with a format that appears to be the standard required by the display. Before creating new lines, fields or frames by interpolation, it is desirable that noise be reduced first to prevent it from affecting the newly created video information. This is a principal application for the system described herein.

This invention assembles data from the incoming video that enables it to filter out noise from the video signal, or equivalently, to improve the signal/noise ratio of the output pixels relative to their value at the input. This data, for each pixel in the current frame being processed, consists of:

(1) an estimate of any motion between the current pixel being considered and the pixel in the previous filtered frame which is at the same horizontal and vertical position as in the one under consideration. The metric that is indicative of the reliability of this estimate is md;

(2) an estimate of the best motion vector $[v_x, v_y]$, between a block containing the current pixel and a block in the previous filtered frame. Using the position of the current pixel and the motion vector, a second pixel is found in the filtered previous frame that has the position of the current pixel after motion compensation. The metric that is indicative of the reliability of the motion compensation estimate is mc;

(3) an estimate of the power in the noise corrupting the value of the current pixel.

Thus three quantities are produced which could be used to improve the signal to noise ratio of the value, e.g. the intensity, associated with the current pixel:

(1) The intensity $I_t(x,y)$ of the current pixel itself, the notation showing that the intensity is measured at the location (x,y) and at the time t;

(2) The intensity of the pixel at (x,y) in the filtered frame $\hat{I}_{t-1}(x,y)$, the subscript showing that this value comes from the frame that immediately precedes the current frame and the "^" indicating that this intensity has been filtered.

(3) The intensity of the pixel at $(x-v_x, y-v_y)$ in the previous filtered frame and therefore has the intensity $\hat{I}_{t-1}(x-v_x, y-v_y)$.

Because the only past values of the intensity used for noise reduction come from the previous filtered frame, the noise reduction process is recursive; i.e., the new data represented by $I_t(x,y)$ is only used to update the frame of filtered—i.e., noise reduced—data.

As explained in the background section, the primary technique available for noise reduction is weight averaging. The weight averaging of the variables $Z_i, Z_2 \ldots Z_n$, for example, is represented by $$\text{Weighted Averaged Sum} = \sum_{i=1}^{n} W_i Z_i$$

where $$W_i \geq \alpha$$

and $$\sum_{i=1}^{n} W_i = 1$$

If the variables $\{Z_i\}$ were noisy pixel intensities that all had the same noise-free brightness, weight averaging would leave the noise-free brightness of the weight averaged sum unchanged.

In one embodiment of this invention, weight averaging is achieved by processing two pixel intensities at a time and utilizing the intermediate results as inputs to another pairwise weight-averaging operation. Cascading weight averaging operations can be done without loss of generality, because weight averaging two weight averaged sums results in a sum which is itself weight averaged. The weights are derived from the metrics md and mc, and a measured probability, $p_{noise}$, associated with the noise level. The sequence of weight averaging operations are as follows:

i) Combine $I_t(x,y)$ and $\hat{I}_{t-1}(x,y)$ obtaining $\hat{I}_{md}$ using a weight derived from md.

ii) Combine $I_t(x,y)$ and $\hat{I}_{t-1}(x-v_x, y-v_y)$ obtaining $\hat{I}_{mc}$ using a weight derived from mc.

iii) Combine $\hat{I}_{mc}(x,y)$ and $\hat{I}_{md}(x,y)$ to get $\hat{I}_{md\,mc}(x,y)$ using a weight derived from mc, md and $p_{noise}$.

iv) Combine $I_t(x,y)$ and $\hat{I}_{md\,mc}$ to get $\hat{I}_t'(x,y)$ using a weight derived from the three measured variables mc, md and $p_{noise}$.

v) Select either $I_t'(x,y)$ or an amplitude limited version of $I_t(x,y)$ depending on the noise level.

Excluding the possibility that the noise level requires step (v) to be executed the net result is that the filtered value of $I_t(x,y)$ is a weighted average of $\hat{I}_{t-1}(x,y)$, $\hat{I}_{t-1}(x-v_x, y-v_y)$ and $I_t(x,y)$.

An application envisioned for the noise reducing filter is shown in FIG. 1A. An analog video signal is received by a video receiver's antenna or, alternately, from a cable network, both shown in block 1. The receiver 8 consists of a chain of operations. Generally there is broadband amplification 2 at the receiver's input to improve noise performance, followed by a tuner 3 and a detector and gain element 4. Baseband video is available at this point. Not shown is digitization and storage of the video that facilitates all further processing. The noise reduction filter 5 follows to eliminate, as far as possible, additive noise using the properties of the video signal itself.

Standards conversion takes place using the filtered signal in 6, a step which, as noted earlier, involves interpolating between video lines and/or frames. The video signal's format now matches that required by the display system 7.

Temporal noise reduction usually requires corresponding pixel values from a number of consecutive frames, each of which is buffered in a frame buffer in a hardware implementation. To lower the hardware cost, often only two frame buffers are used in implementation: one holds the result of filtering the previous filtered frame $\hat{I}_{t-1}$ where t−1 indicates I is the intensity of the filtered frame that immediately precedes the current one; the other stores a corresponding weight frame $\hat{w}_{t-1}$, where $\hat{w}_{t-1}$ at (x,y) is a weight used for the temporal filtering of the pixel at (x,y) of $I_t$. The weight $\hat{w}_{t-1}(x,y)$ was computed when $\hat{I}_{t-1}(x,y)$ was evaluated and is itself needed to compute $\hat{I}_t(x,y)$. Intermediate data that is not used after a new filtered pixel at time t is generated is kept in reusable storage internal to the temporal noise reduction block 12 in FIG. 1B, that manages the contents of the two frame buffers. It is assumed that the noise variance of the Gaussian additive noise, denoted as σ, is obtained through a noise estimation method described in the literature, and is not part of this system.

Figure 1B:
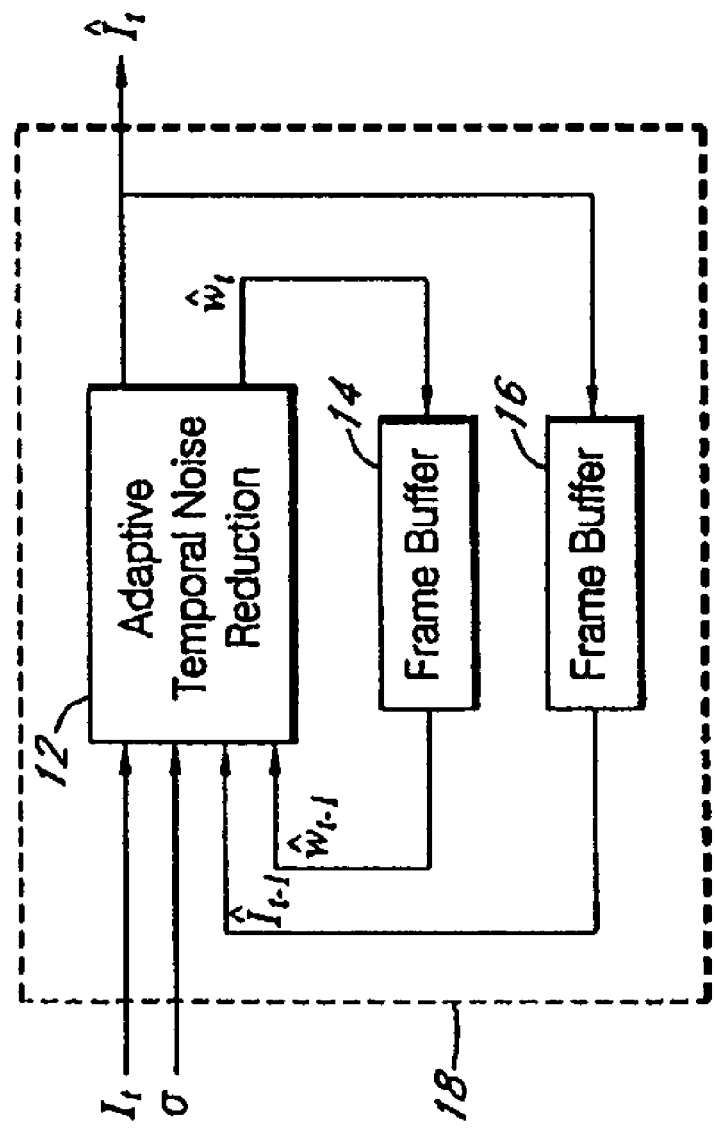
FIG. 1B shows the structure of the noise reduction filter that has two frame buffers and logic for generating a noise reduced version of the current video frame, and is a block diagram of an exemplary hardware realization of a temporal filter that reduces noise in video.

The structure of a video noise reduction system suitable for realization in hardware is shown in FIG. 1B. For brevity, the value of t is an integer and the locational coordinates (x,y) may be omitted. The unfiltered frame $I_t$ is input to the adaptive temporal noise reduction block 12 along with the estimated noise variance σ and the two frames of data from the two frame buffers 14 and 16. One frame holds the filter output $\hat{I}_{t-1}$ from the previous frame at time t−1; the other is the corresponding frame of weights $\hat{w}_{t-1}$ evaluated in the last iteration of temporal noise reduction. At the beginning, the initial weight frame $\hat{w}_0$ is set to 0. An input buffer (not shown) holds values of the current frame's pixel intensities until they are no longer needed.

Figure 2:
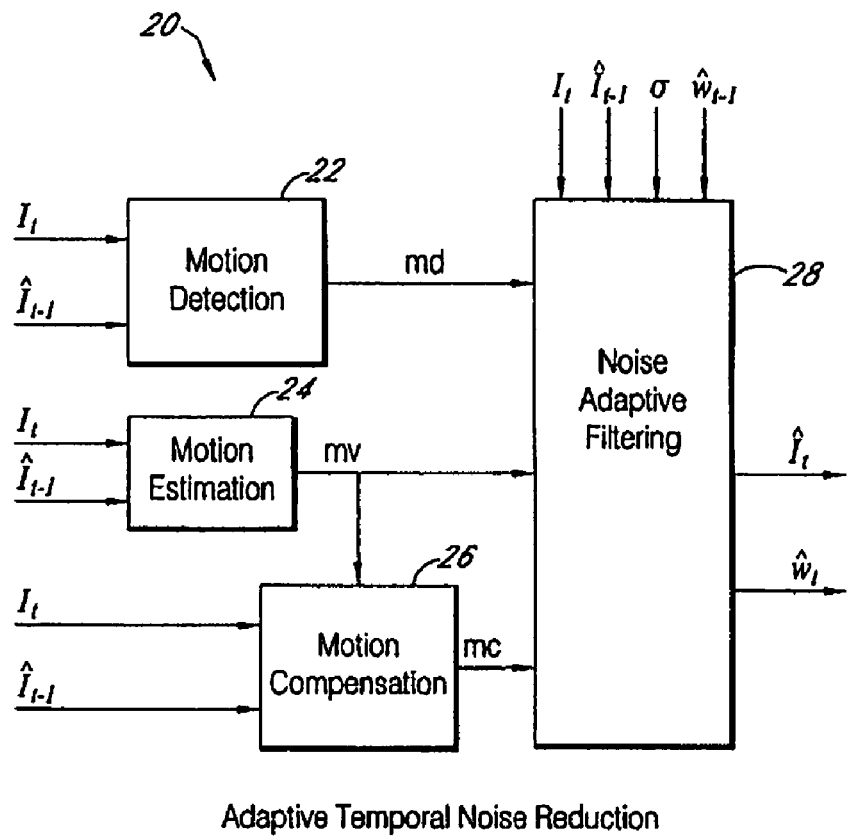
FIG. 2 is a dataflow diagram describing the system's input/output variables and the application of motion detection, motion estimation, motion compensation, and noise adaptive filtering blocks in the noise reduction filter and presents an exemplary hardware structure of the adaptive temporal noise reduction block in FIG. 1B.
Figure 3:
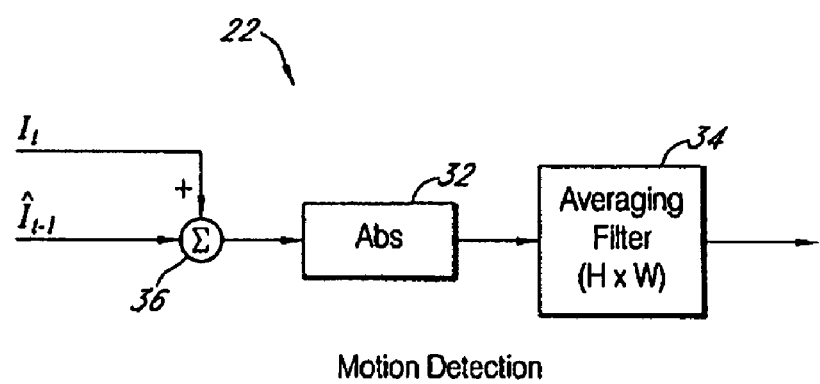
FIG. 3 is a dataflow diagram of the motion detection block of FIG. 2.

The adaptive temporal noise reduction system in FIG. 1B includes sub-systems shown in FIG. 2. Their individual functions are separated into a motion detection block 22, a motion estimation block 24, a motion compensation block 26 an d a noise adaptive filtering block 28. Both motion detection and motion compensation blocks accept the current unfiltered input frame $I_t$ and the buffered filtered frame $\hat{I}_{t-1}$. The motion detection block 22 determines the magnitude of the motion between the filtered previous frame $\hat{I}_{t-1}$ and the current frame $I_t$, the associated metric hypothesizing the absence of motion. As shown in FIG. 3, the absolute value of the difference between the above two frames is obtained and then an averaging filter of size H×W is applied to yield the motion detection metric md, i.e., $$md = \frac{1}{H \times W} \sum_{x,y \text{ within } H \times W \text{ neighborhood}} |I_t(x, y) - \hat{I}_{t-1}(x, y)|. \quad (1)$$

where H and W are predetermined values of height and width.

The quantity md is the summed absolute value of the difference between the intensity of a pixel in the current frame and a pixel in the same position in the noise reduced previous frame, averaged over a rectangular neighborhood of the pixel.

Motion estimation is applied to obtain the motion vector $mv=(v_x, v_y)$ of each rectangular block in the current frame $I_t$. The whole image is divided into different non-overlapping rectangular blocks, and every pixel in each block shares a single motion vector. For each block, the motion vector is computed as follows:

$$mv = \arg\min_{v_x, v_y} \left( \sum_{x,y \text{ in block}} |I_t(x, y) - \hat{I}_{t-1}(x - v_x, y - v_y)| \right). \quad (2)$$

This motion vector is fed to the motion compensation block. Like motion detection, the motion compensation value mc is indicative of how much similarity between the two blocks is due to the motion vector mv. The quantity mc is $$mc = \frac{1}{H \times W} \sum_{x,y \text{ within } H \times W \text{ neighborhood}} |I_t(x, y) - \hat{I}_{t-1}(x - v_x, y - v_y)|. \quad (3)$$

These motion detection and motion compensation values are then fed to the adaptive filtering block 28 of FIG. 2, together with estimated noise variance σ, the current frame $I_t$, previous filtered frame $\hat{I}_{t-1}$ and buffered weight frame $\hat{w}_{t-1}$. The output of this noise adaptive filtering block is a first version of the filtered current frame $\hat{I}_t$ and its corresponding weight frame $\hat{w}_t$. This is shown in the adaptive filtering block 28. The motion detector 22 of FIG. 2 accepts $I_t$ and $\hat{I}_{t-1}$ as an input as does the motion estimator 24 and the motion compensation unit 26. The noise adaptive filter 28 outputs $\hat{I}_t$ and weight $\hat{w}_1$ based on the quantities md, mv, mc, $I_t$, $\hat{I}_{t-1}$, σ, and $\hat{w}_{t-1}$. FIG. 3 is a further refinement of motion detector 22 and is a graphical representation of Eq. (1) with a summation unit 34, an absolute value operation 32 and a differencing node 36.

Figure 4A:
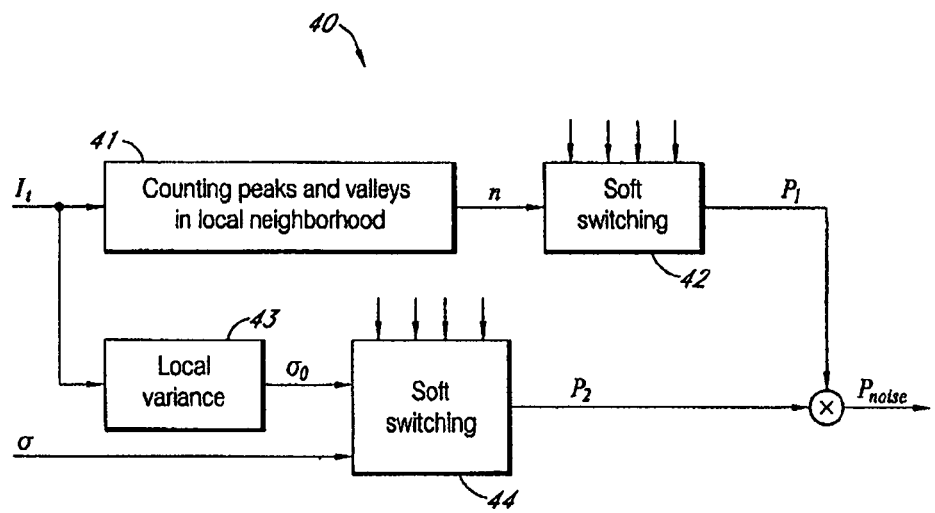
FIG. 4A is a flow chart illustrating the computation of the noise probability needed for noise adaptive filtering.
Figure 4B:
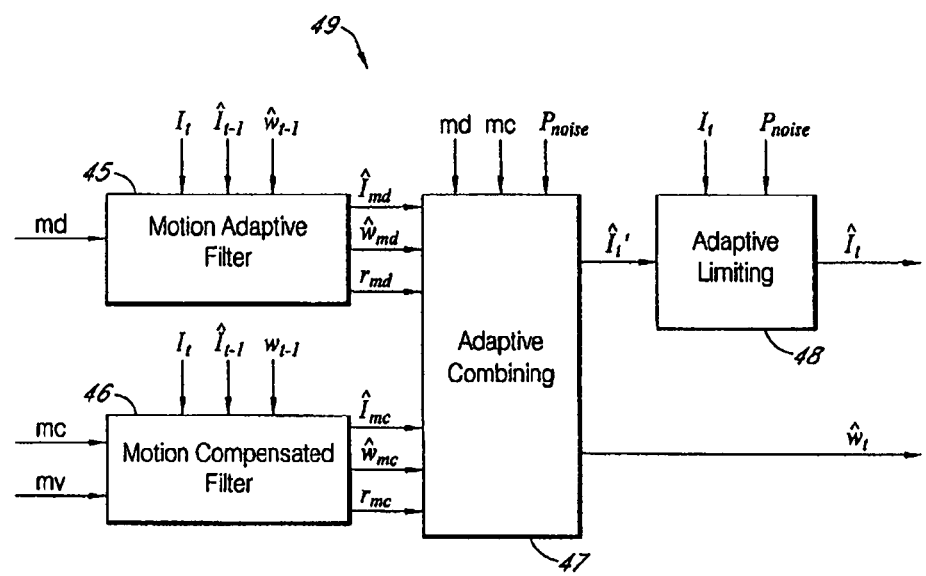
FIG. 4B is a block diagram describing the noise adaptive filtering block that receives the results of the noise computation block shown in FIG. 4A.

After motion detection and motion compensation values are computed, noise adaptive filtering is applied to obtain the output frame and weight frame. A more detailed diagram of the noise adaptive filtering block 28 is shown in FIG. 4B. Dataflow 40 in FIG. 4A shows the computation of a probability $p_{noise}$, which is an indicator of whether the noise level of the current pixel would affect the video. This probability value ranges from 0 to 1, and is the product of two probabilities, $p_1$ and $p_2$. Probability $p_1$ is indicative of whether the neighborhood has significant variation in amplitude, while the probability $p_2$ is related to the variance of the local video.

Figure 5:
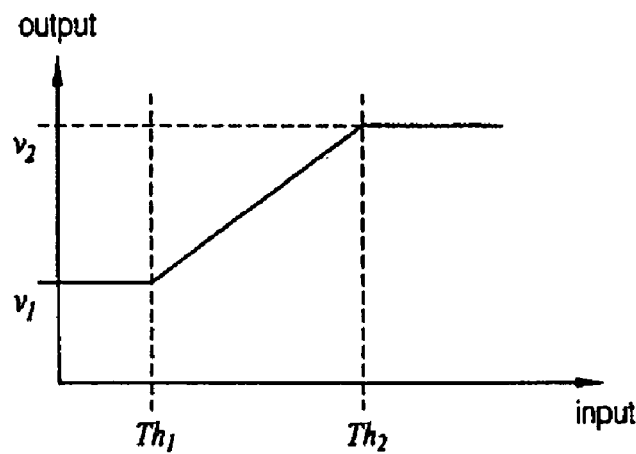
FIG. 5 is the defining curve of soft switching that is used in this system to express functional dependence.

To compute probability $p_1$, the peaks and valleys within a local region centered at the pixel are counted in block 41. These are based on the examination of each pixel. For each pixel in a local neighborhood, if its intensity value is greater than every pixel surrounding itself, it is counted as a peak; if its intensity value is less than that of every pixel that surrounds, it is counted as a valley. The computation of the hills and valleys in noise estimator 41 is based on the observation that when a video region is affected by significant additive noise, the high frequency components in the noise create a significant amplitude variation in intensity that is related to the noise power. However, a part of this variation is due to the local average variation in video intensity. This quantity is separately estimated by measuring the local standard deviation of the video intensity $\sigma_0$. In FIG. 4A this quantity is converted into $p_2$, a probabilistic measure that the standard deviation of the video equals or is less than the estimated noise variance. The functional relationships between the experimentally derived values and probabilities $p_1$ and $p_2$ are found through simulation. The number of the peaks and valleys are counted to obtain a value n, which is then soft switched to compute a probability $p_1$. The soft switching block here and elsewhere in this patent application are of the same functional form. They are defined by four values: $v_1, v_2, Th_1, Th_2$. The output is calculated according to the model illustrated in FIG. 5. In one embodiment of this invention, a 5×5 neighborhood is used for counting peaks and valleys. The parameters that define the operation of the soft switching operation 42 that relates the peak/valley count to $p_1$ is $v_1=0.0$, $v_2=1.0$, $Th_1=3$, $Th_2=12$.

To compute probability $p_2$, the local standard deviation of the intensity $\sigma_0$ is first evaluated in block 43 and soft switched in block 44 to a probability value $p_2$. In one embodiment of this invention, $v_1=1.0$, $v_2=0.0$, $Th_1=\sigma+a$, $Th_2=\sigma+b$ is used, where a and b can be adjusted. The noise probability $p_{noise}$ is then computed as $$p_{noise}=p_1 \times p_2 \quad (4)$$

FIG. 4B illustrates the operation of noise adaptive filtering. The motion detection indicator md, together with the current intensity $I_t$, previous filtered intensity $\hat{I}_{t-1}$, and buffered weight $\hat{w}_{t-1}$, are fed to a motion adaptive filter 45 to obtain a motion adaptive filtered value $\hat{I}_{md}$, a motion detection weight $\hat{w}_{md}$, and a ratio $r_{md}$. Similarly, the motion compensation indicator mc, together with the motion vector indicator mv, the current intensity $I_t$, previous filtered intensity $\hat{I}_{t-1}$ and buffered weight $\hat{w}_{t-1}$, are fed to motion adaptive filter 46 to obtain a motion adaptive filtered $\hat{I}_{mc}$, a motion detection weight $\hat{w}_{mc}$, and a ratio frame $r_{mc}$. Each of these quantities has a value at the location coordinates (x,y) where pixels are defined. The adaptive combiner 47 creates the new filter value $\hat{I}_t'(x,y)$ and the associated value of the weight $w_t$; an adaptive limiter 48 confines changes to $I_t$ to within certain limits whenever $p_{noise}$ exceeds a threshold value.

Figure 6:
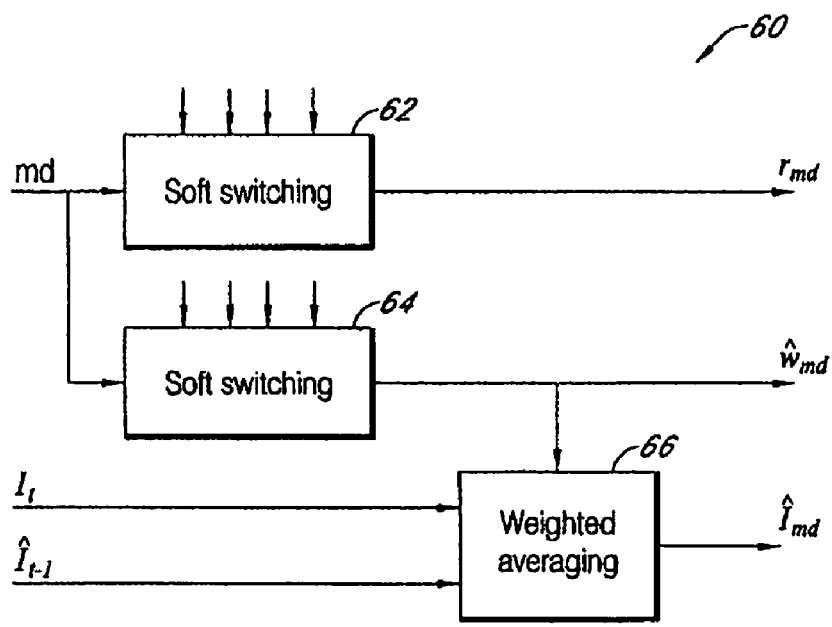
FIG. 6 presents an expanded view of the motion adaptive filtering block of FIG. 4B that is based on the soft switching of the motion detection metric found in this system.

The motion adaptive filtering block is shown in detail in FIG. 6. Note that when md is small there will be a great deal of similarity between the current frame value at (x,y) and the filtered frame value at the same location. Use is made of this similarity in computing $r_{md}$, which is a measure of this similarity. The motion detection value md is first soft switched in blocks 62 and 64 shown in FIG. 6 to obtain, respectively, the ratio value $r_{md}$ and weight value $\hat{w}_{md}$. To obtain ratio $r_{md}$, in one of the embodiments of the present invention, its switch parameters are set to $v_1=1.0$, $v_2=0.0$ and the two thresholds are related to the estimated noise variance σ, $Th_1=1.5\sigma$, $Th_2=3.0\sigma$.

To obtain weight value $\hat{w}_{md}$, the previous weight frame $\hat{w}_{t-1}$ is used as value $v_1$, and $v_2=0$. The two thresholds are set to be the same as those used for computing $r_{md}$. The computed weight $\hat{w}_{md}$ is used in a weight averaging unit 66 to obtain a new value of intensity $\hat{I}_{md}$ from the current intensity $I_t$ and the previous filtered intensity $\hat{I}_{t-1}$. This weight averaging block performs the task of weight averaging, with one weight and two inputs. The operation is defined as follows: with inputs $I_1$ and $\hat{I}_0$ and weight $\hat{w}$, the output is $\hat{I}$, given as $$\hat{I}=(\hat{w}\cdot\hat{I}_0+I_1)/(\hat{w}+1). \tag{5}$$

Figure 7:
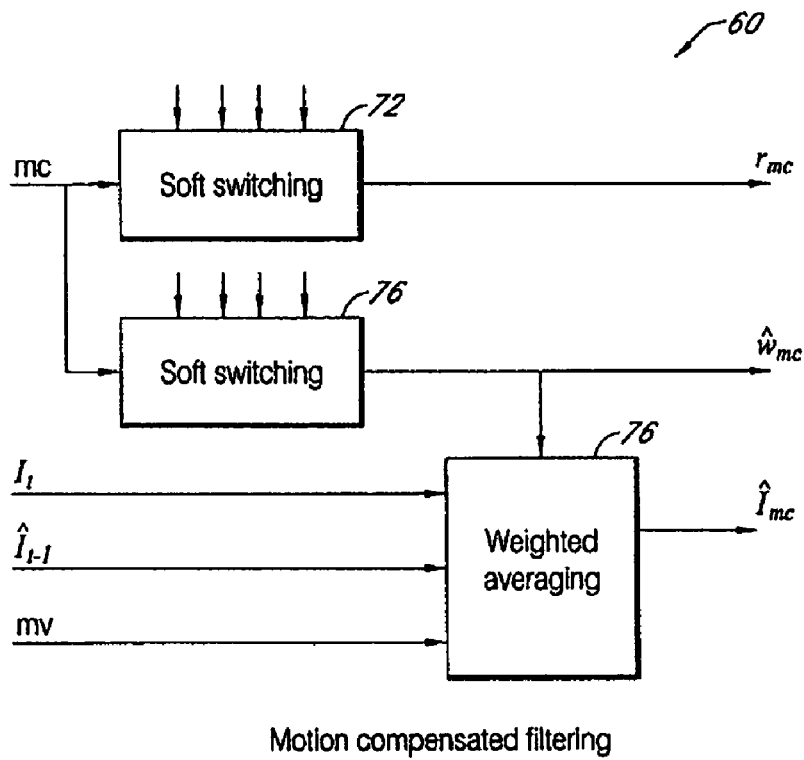
FIG. 7 is a block diagram of the motion compensated filtering block of FIG. 4B based on the soft switching of the motion compensation metric and the motion vectors that were estimated previously for application in this block.

Motion compensated filtering is very similar to motion adaptive filtering, as shown in FIG. 7. Soft switching operations blocks 62 and 66 that operate on mc to form $r_{mc}$ and $\hat{w}_{mc}$ are unchanged from those used to form $r_{md}$ and $\hat{w}_{md}$. The only difference between the two forms of filters is that the motion vector mv is included in the input for the weight averaging in block 76. For pixel I(x,y) and corresponding motion vector mv(x,y)=$(v_x,v_y)$, the output $\hat{I}_{mc}$ is calculated as $$\hat{I}_{mc}(x,y)=(\hat{w}_{mc}(x,y)\cdot\hat{I}_{t-1})(x-v_x,y-v_y)+I_t(x,y))/(\hat{w}_{mc}(x,y)+1) \tag{6}$$

Adaptive Combining

Figure 8A:
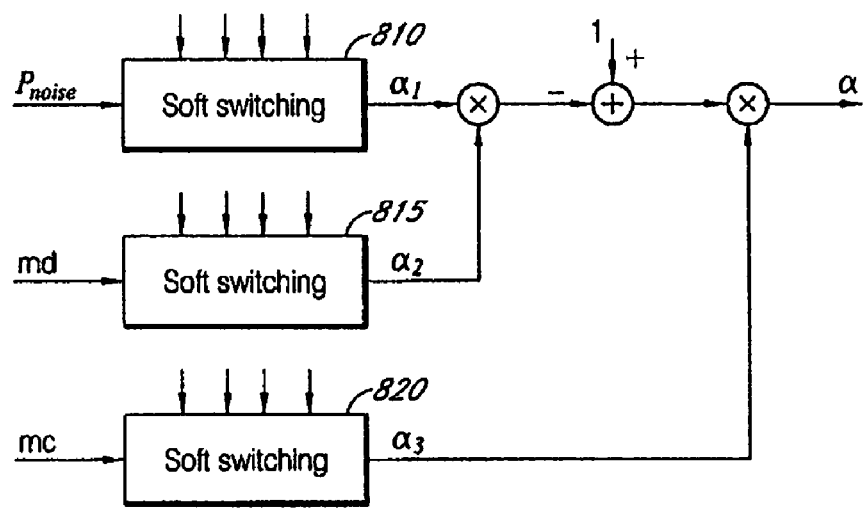
FIG. 8A is a dataflow diagram illustrating the computation of α, an important weight used in averaging that is computed from the noise probability, the motion detection value and the motion compensation value.

The motion adaptive value $\hat{I}_{md}$, the motion compensated value $\hat{I}_{mc}$, and their corresponding ratio and weight, are adaptively combined using the estimated probability of noise. A detailed diagram of block 131 of FIG. 1C$_2$ is shown in FIG. 8A, which shows a weight averaging parameter α, which is computed as α=$(1-\alpha_1\cdot\alpha_2)\cdot\alpha_3$, where $\alpha_1$, $\alpha_2$ and $\alpha_3$ are soft switched from $p_{noise}$, md and mc, in blocks 810, 815, and 820, respectively. In one of the embodiments of the present invention, the settings $v_1$=0.0, $v_2$=1.0, Th$_1$=0.75, Th$_2$=1.0 are made to find $\alpha_1$,
$v_1$=1.0, $v_2$=0.0, Th$_1$=0.0, Th$_2$=0.5 are made to find $\alpha_2$, and
$v_1$=1.0, $v_2$=0.0, Th$_1$=$t_1$·md, Th$_2$=$t_2$·md for $\alpha_3$, where $t_1$ and $t_2$ can be adjusted.

Figure 8B:
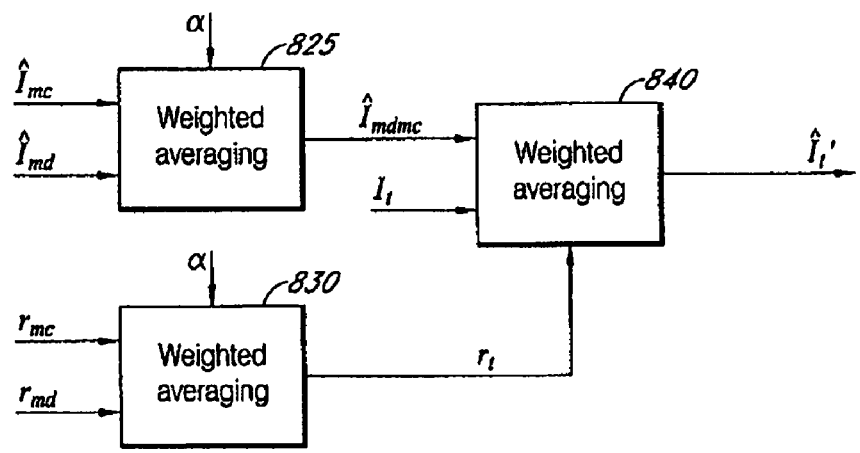
FIG. 8B illustrates the use of a in weight averaging to obtain a combined frame from the results of motion detection and motion compensation which is then combined with the current received frame.
Figure 8C:
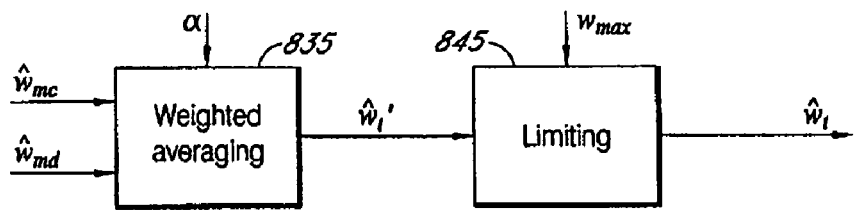
FIG. 8C depicts the generation of a weight used in filtering noise from the frame succeeding the current one.

With weight averaging parameter α computed, $$\hat{I}_{mdmc}=\alpha\cdot\hat{I}_{mc}+(1-\alpha)\cdot\hat{I}_{md}, \tag{7}$$

$$r_t=\alpha\cdot r_{mc}+(1-\alpha)\cdot r_{md}, \tag{8}$$

and $\hat{w}_t=\alpha\cdot\hat{w}_{mc}+(1-\alpha)\cdot\hat{w}_{md}$, (9)

as shown in blocks 825, 830 and 835 in FIGS. 8B and 8C. Furthermore, the output $\hat{I}_t'$ is found in block 840 as the weighted average of the resulting $\hat{I}_{mdmc}$ and the current frame $I_t$, $$\hat{I}_t'=r_t\hat{I}_{mdmc}+(1-r_t)\cdot I_t \tag{10}$$

The computed weight frame $\hat{w}_t'$ is limited in block 845 by a predetermined maximum value $w_{max}$ to obtain the final weight frame $\hat{w}_t$. In one embodiment of the present invention, the maximum weight value $w_{max}$ is set to be 8.

Figure 9:
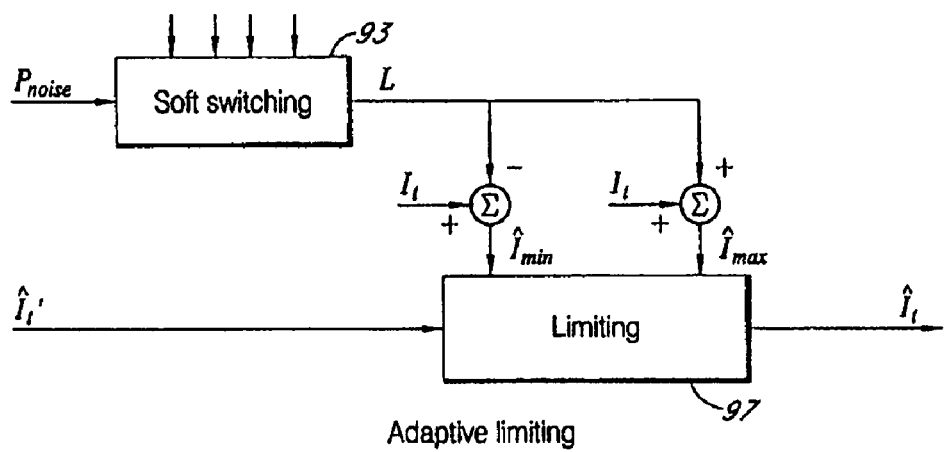
FIG. 9 illustrates adaptive limiting, whereby a limit value derived from the noise probability is used to limit the excursion of the filtered image intensity from its noisy unfiltered value.

The last step of the present invention contains noise adaptive limiting for the computed weight averaging frame $\hat{I}_t'$ that is based on motion adaptive filtering and motion compensated filtering. Details of its operation are shown in FIG. 9. The noise probability $p_{noise}$ is soft switched in block 93 to obtain a limit value L, which defines a range around the original frame $I_t$. The final output $\hat{I}_t$ is then computed in limiter 97 as $\hat{I}_t$=max(min($I_t',\hat{I}_{max}),\hat{I}_{min}$), where $\hat{I}_{min}=I_t-L$ and $\hat{I}_{max}=I_t+L$. In one embodiment of the present invention, the parameters for soft switching $p_{noise}$ are set to $v_1$=1.0, $v_2$=8.0, Th$_1$=0.25, Th$_2$=0.75.

FIG. 1C summarizes the operation of the temporal noise reduction filter in dataflow form as system 160. A new frame of video is collected from a noisy source and processed pixel by pixel in 103 to form a metric md that is a measure of the similarity between the block of pixels containing the currently considered pixel with pixels in an identically shaped and placed block in the last filtered frame. The mc metric, a measure of the difference between a block from the current frame and a similar motion compensated block in the last filtered frame is found in estimator 105. Estimator 105 shares its hardware with estimator 103. New data is collected in peaks/valleys counter 107, and in the estimator of the local standard deviation $\sigma_0$, 109.

This data is soft switched in the soft switch 111 that converts md to $\alpha_2$, in 113 to convert md to $r_{md}$ and in 118 to convert md to $\hat{w}_{md}$. In a similar process mc is converted to $\hat{w}_{mc}$, $r_{mc}$ and $\alpha_3$ in soft switches 117, 119, and 121. The peaks/valleys count found in counter 107 is soft switched in 123 into $p_1$; the local standard deviation $\sigma_0$ is soft switched in 125 into $p_2$. The two probability-like numbers are multiplied together in multiplier 127 to compute $p_{noise}$. The quantity $p_{noise}$ is then soft switched in 129 to determine the value of $\alpha_1$ and in 133 to evaluate a limiting value L that is used in limiter 151. The other two components of α are collected from 111 and 121 respectively; in step 131 the value of α is evaluated. This number and its mate (1−α) are used as weights in 147 and 141. A series of weighted averages of pixel values are computed in 145, 143, 147 and 149, the idea being to weight time-displaced pixels which appear to be highly correlated approximately equally in forming the filters output; when the correlation appears to be low, the filter's output should favor the pixel from the current frame. In 143, the motion compensated value of $\hat{I}_{t-1}$ is used and is denoted by $\hat{I}_{t-1}$(mv).

A possible embodiment of this invention is depicted in FIG. 1B as block 18. Memory in the form of frame buffers is supplied in blocks 14 and 16. The filter requires storage for the current frame, i.e., an input buffer that stores $I_t$ (not shown), storage for the frame buffer storing $\hat{I}_{t-1}$ and storage for the frame storing $\hat{w}_t$, the weight needed to compute the filtered frame following the current one. One way of operating the filter is to compute and store mc and md for each value of (x,y) upon receiving the complete current frame. Then, after $\hat{I}_t(x,y)$, the filter's output at time t and location at x,y, is computed, it can be substituted for $I_t(x,y)$, the current frame's intensity at x,y. Likewise $\hat{w}_t(x,y)$ can be substituted for $\hat{w}_{t-1}(x,y)$.

It is noted that the system may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

It should also be apparent to those skilled in the art that one or more elements of a device disclosed herein may be rearranged without affecting the operation of the device. Similarly, one or more elements of a device disclosed herein may be combined without affecting the operation of the device. Those of ordinary skill in the art would understand that information and signals may be represented using any of a variety of different technologies and techniques. Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

In addition, the various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added without departing from the spirit or scope of the disclosed method and apparatus. The description of the system is intended to be illustrative, and not to limit the scope of the claims.

What is claimed is:

1. A method for temporally filtering noise from a plurality of sequential video frames comprising:
   selecting a first pixel from a current frame at a location (x,y) having an intensity $I_t(x,y)$;
   selecting a second pixel at (x,y) in a filtered frame immediately preceding the current frame, the filtered second pixel having an intensity denoted by $\hat{I}_{t-1}(x,y)$;
   determining a motion vector $[v_x, v_y]$ that provides a close match between a neighborhood containing the first pixel and a similarly configured neighborhood in the filtered frame that immediately precedes the first frame in time;
   determining the intensity of a third pixel at a location that is offset from the first pixel's by the magnitude and direction of the motion vector, the location being $(x-v_x, y-v_y)$ in the filtered frame immediately preceding the current frame, and the intensity being denoted by $\hat{I}_{t-1}(x-v_x, y-v_y)$; and
   computing the output of the temporal filter at the location (x,y) to be a weight averaged sum of three intensity values: the intensities of the first pixel, the second pixel and the third pixel.

2. The method of claim 1, wherein a metric md is detestlined that is indicative of relative motion between a neighborhood of the first pixel and an identically configured neighborhood of the second pixel.

3. The method of claim 1, wherein a metric mc is determined that is indicative of the measure of fit between a neighborhood of the first pixel and a similarly configured motion compensated neighborhood in the filtered frame that immediately precedes the current frame.

4. The method of claim 1, further comprising two components $p_1$ and $p_2$, of a quantity $p_{noise}$, wherein $p_1$ is found by counting the peaks and valleys of the intensity in a local neighborhood of the first selected pixel in the current frame and soft-switching the result, and $p_2$ is found by computing the local standard deviation of the pixels' intensity and soft switching the result; and wherein $p_{noise}$ is equal to $p_1$ multiplied by $p_2$.

5. The method of claim 1, wherein the weights applied to $I_t(x,y)$, $\hat{I}_{t-1}(x,y)$ and $\hat{I}_{t-1}(x-v_x, y-v_y)$ are based on md, mc, and $p_{noise}$.

6. The method of claim 1, further comprising:
   evaluating a limit L based on the probability associated with the noise;
   selecting the filter's output to be $\hat{I}_t'$ unless $|I_t - \hat{I}_t'|$ is greater than L; and
   selecting the filter's output to be either $I_t + L$ or $I_t - L$, depending on which value is closer to $\hat{I}_t'$.

7. The method of claim 1, wherein the computation of the weight averaged sum comprises:
   combining $I_t(x,y)$ and $\hat{I}_{t-1}(x,y)$ to obtain $\hat{I}_{md}(x,y)$ using weights derived from md;
   combining $I_t(x,y)$ and $\hat{I}_{t-1}(x-v_x, y-v_y)$ to obtain $\hat{I}_{mc}$ using weights derived from mc;
   combining $\hat{I}_{mc}(x,y)$ and $\hat{I}_{md}(x,y)$ to get $\hat{I}_{md\,mc}(x,y)$ using a weight derived from mc, md and $p_{noise}$;
   combining $I_t(x,y)$ and $\hat{I}_{md\,mc}(x,y)$ to get $\hat{I}_t'(x,y)$ using a weight derived from the three measured variables mc, md and $p_{noise}$; and
   selecting either $I_t'(x,y)$ or an amplitude limited version of $I_t(x,y)$, depending on a limit value derived from pnoise.

8. The method of claim 7, wherein the weight used to form the weighted average of the first pixel from the current frame and the second pixel from the filtered second frame is found by passing md through a soft switcher to form $\hat{w}_{md}$.

9. The method of claim 8, wherein the weight used to form the weighted average of the first pixel from the current frame and the third pixel from the filtered second frame that is motion compensated is found by passing mc through a soft switcher to form $\hat{w}_{mc}$.

10. The method of claim 9, wherein averaging the pixel intensities $\hat{I}_{md}(x,y)$ and $\hat{I}_{mc}(x,y)$ comprises finding three components to a weight α as follows:
    a weight $\alpha_1$ that is found by passing pnoise through a soft-switcher;
    a component $\alpha_2$ that is found by putting md in a soft-switcher;
    a component $\alpha_3$ that is found by passing mc through a soft-switcher; and
    wherein α is defined as a quantity $(1-\alpha_1 \cdot \alpha_2)\alpha_3$.

11. The method of claim 10, wherein the weight used to average $\hat{I}_{md}(x,y)$ and $\hat{I}_{md}(x,y)$ is α.

12. The method of claim 11, further comprising a ratio $r_{md}$ and the weight $\hat{w}_{md}$, wherein $r_{md}$ is found by soft-switching md, $\hat{w}_{md}$ is found by soft switching md, and the soft switching that forms $\hat{w}_{md}$ is based on a weight determined in forming the filtered frame that immediately precedes the current frame.

13. The method of claim 12, further comprising a ratio $r_{mc}$ and a weight $\hat{w}_{mc}$, wherein $r_{mc}$ is found by soft switching mc, $\hat{w}_{mc}$ is found by soft switching mc, and the soft switching that forms $\hat{w}_{md}$ is based on a weight found in forming the filtered frame that immediately precedes the current frame.

14. The method of claim 13, further comprising a weight $r_t$ that is found by weight averaging $r_{mc}$ and $r_{md}$ using $\alpha$ as the weight.

15. The method of claim 14, wherein a quantity $\hat{w}_t'$ that is computed as the weighted average of $\hat{w}_{md}$ and $\hat{w}_{mc}$ using $\alpha$ as the weight that is further limited to a maximum value to form a final weight $\hat{w}_t$ that is associated with coordinates x, y and t.

16. The method of claim 15, wherein $\hat{w}_t$ will be used in filtering the pixel at (x, y, t+1).

17. The method of claim 16, wherein a preliminary version of the filter's output $\hat{I}_t'$ is formed as the weighted average of $\hat{I}_{mdmc}$ and $I_t$ based on the weights $r_t$ and $(1-r_t)$.

18. A system for filtering noise from a plurality of video frames comprising:
an adaptive temporal noise reduction block configured to utilize motion detection and motion compensation metrics based on a current frame and a filtered frame that immediately precedes it to form filtered pixels of a current filtered frame, the adaptive temporal noise reduction block having:
a motion detection block for detecting a relative motion between an area containing a first pixel in the current frame and an identically configured area in the filtered frame and for generating a metric md indicative of the relative motion;
a motion estimation block for finding a motion vector mv indicative of a relative displacement between an area containing the first pixel in the current frame and a similarly configured area in the filtered frame;
a motion compensation block for computing a metric mc indicative of the measure of fit between an area containing the first pixel in the current frame and a similarly configured motion compensated area in the filtered frame; and
a noise adaptive filtering block for accepting md, mv, mc as inputs, measurements of the variance of the noise in a neighborhood of a selected pixel, and inputs from three buffers, for computing values of a weight stored in one of the three buffers, and for reading out the values to form the filtered pixels of the current filtered frame.

19. The system of claim 18, further comprising:
a buffer configured to provide a selected first pixel's video intensity from the current frame;
a first frame buffer configured to provide at least one pixel's video intensity from the filtered frame; and
a second frame buffer configured to store a weight computed in filtering a frame immediately preceding the current frame and to provide it in filtering the current frame.

20. The system of claim 19, wherein the inputs processed by the noise adaptive filtering block includes:
the value of the first pixel's intensity from the buffer;
two pixel intensities from the first frame buffer;
the value of the weight from the second frame buffer; and
the value of the noise variance in a neighborhood of the first pixel.

* * * * *